United States Patent [19]

Hirose et al.

[11] 4,426,788
[45] Jan. 24, 1984

[54] INCLINOMETERS

[75] Inventors: Hisashi Hirose; Hiroshi Arai, both of Toyota; Hiroshi Iiyama, Yokosuka; Hirokazu Komiya, Tokyo, all of Japan

[73] Assignees: Toyota Jidosha Kabushiki Kaisha; Jeco Co., Ltd., both of Japan

[21] Appl. No.: 469,380

[22] Filed: Feb. 24, 1983

[30] Foreign Application Priority Data

Feb. 26, 1982 [JP] Japan .............................. 57-27016[U]

[51] Int. Cl.³ .............................................. G01C 9/16
[52] U.S. Cl. ....................................... 33/395; 33/399; 33/401
[58] Field of Search ................. 33/395, 398, 399, 401, 33/402, 391, 397, 1 E

[56] References Cited

U.S. PATENT DOCUMENTS

| 2,355,517 | 8/1944 | Weese | 33/395 |
| 2,651,848 | 9/1953 | Sims | 33/395 |
| 3,378,932 | 4/1968 | Neill | 33/401 |

FOREIGN PATENT DOCUMENTS 321736  11/1929  United Kingdom .................. 33/395

Primary Examiner—Willis Little
Attorney, Agent, or Firm—Remy J. VanOphem

[57] ABSTRACT

An inclinometer of the type wherein a weight rotatable in accordance with the inclination of a vehicle is provided for a drive unit, and a torque of the drive unit is transmitted to a driven unit so as to display the inclination angle of the vehicle with an inclination indicator, there are provided a zero point adjusting spiral spring, the inner end thereof being affixed to a shaft of the driven unit, while an outer end is affixed to a rotary drive member, and a zero point adjusting knob for rotating the rotary drive member. According to this invention, after the zero point has been adjusted, the zero point display line of the indicators and the zero point scale line of the scale board can be aligned horizontally, thus improving the appearance of the zero point display.

3 Claims, 8 Drawing Figures

INCLINOMETERS

BACKGROUND OF THE INVENTION

This invention relates to an inclinometer adapted to be mounted on a vehicle.

In recent years, inclinometers are mounted on motor cars and other vehicles for quantitatively displaying the inclination of the road surface on which the vehicles are running. Among such inclinometers is included a gear transmission weight type consisting of a drive member including a weight which rotates in response to inclination of a vehicle, a driven member transmitted with the rotational torque of the drive member, and an indicator secured to the shaft of the driven member for displaying the inclination angle. With this type of inclinometer, under a state in which a zero point should be displayed, the zero point can not always be displayed due to the error of the zero point display caused by manufacturing error, error in the horizontal criterion at the time of mounting the inclinometer on the vehicle, and inclination of the vehicle body due to uneven loading.

Accordingly, according to a prior art zero point mechanism of an inclinometer, as shown in FIGS. 1A and 1B, a disc shaped inclination indicator 2 is secured to one end of a driven shaft 1 driven by a drive mechanism, not shown, and a scale board 3 is coaxially disposed adjacent the inclination indicator 2. The scale board 3 is rotatably supported by a guide ring 4. When adjusting the zero point, the scale board 3 is rotated to make its zero point 0 (thick solid graduation) coincide with the display line P of the inclination indicator 2. Thus, if the inclination indicator 2 is so manufactured as to be slightly (α in FIG. 1A) inclined under the horizontal criterion condition, the scale board 3 is rotated in a direction of arrow a to establish a zero point display as shown in FIG. 1C. The guide ring 4 is marked with digits 0, 20, 40 . . . indicating inclination angles corresponding to respective scale lines of the scale board 3.

According to another prior art inclinometer, a pointer 5 is provided to oppose the periphery of an indicator 2a secured to one end of a driven shaft, as shown in FIG. 2A, and the pointer is rotated in the direction of arrows to set it at the zero point of the indicator 2a. Particularly, if the indicator 2a is inclined by β (FIG. 2A) under the horizontal criterion condition, the pointer 5 is rotated in a direction of arrow b to establish a zero point display as shown in FIG. 2B.

In these zero point mechanisms, however, when the zero point adjustment is completed, in most cases, the display line of the indicator and the zero point 0 of the scale board 3 of the pointer 5 do not posture horizontally, thus not only impairing appearance, but also making it difficult to read the inclinometer.

SUMMARY OF THE INVENTION

It is an object of this invention to provide an improved inclinometer in which after the zero point has been adjusted the zero point display line, the zero point scale line and the main body of the inclinometer can posture horizontally.

Another object of this invention is to provide an inclinometer in which the zero point at which the torque of a hair spring and the torque created by a weight will balance with each other, can readily be adjusted.

According to this invention, there is provided an inclinometer of the type wherein a weight rotatable in accordance with an inclination of a vehicle on which the inclinometer is mounted is provided for a drive unit, and a torque of the drive unit is transmitted to a driven unit so as to display the inclination angle of the vehicle with an indicator fixed to a shaft of the driven unit, characterized in that there are provided a zero point adjusting hair spring, means for securing an inner end of the spring to a shaft of the driven unit, means for securing an outer end of the spring to a rotary drive member, and a zero point adjusting knob for rotating the rotary drive member.

DESCRIPTION OF THE PREFERRED EMBODIMENT

Figure 1A:
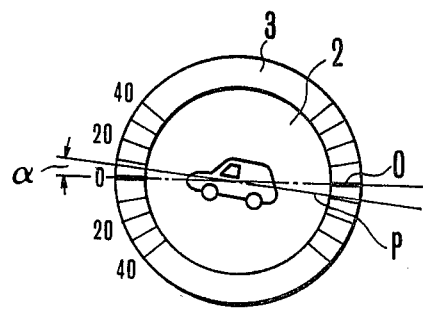
FIG. 1A is a plan view showing a prior art inclinometer.
Figure 1B:
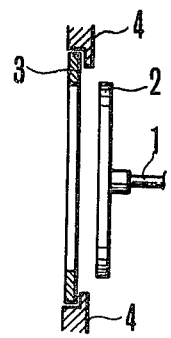
FIG. 1B is a side view showing the inclinometer shown in FIG. 1A.
Figure 1C:
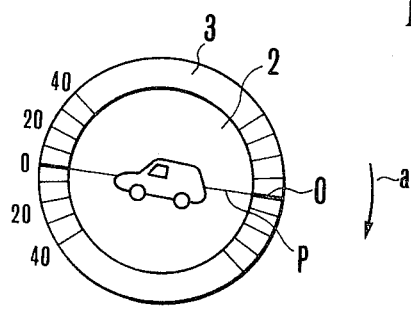
FIG. 1C is a plan view showing a zero point display established in the inclinometer of FIG. 1A.
Figure 2A:
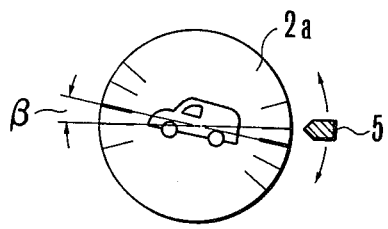
FIG. 2A is a plan view showing another prior art inclinometer.
Figure 2B:
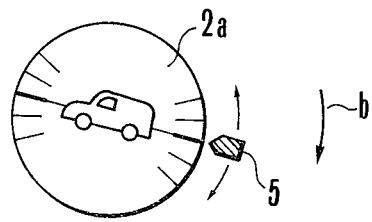
FIG. 2B is a plan view showing a zero point display established in the inclinometer of FIG. 2A.
Figure 3:
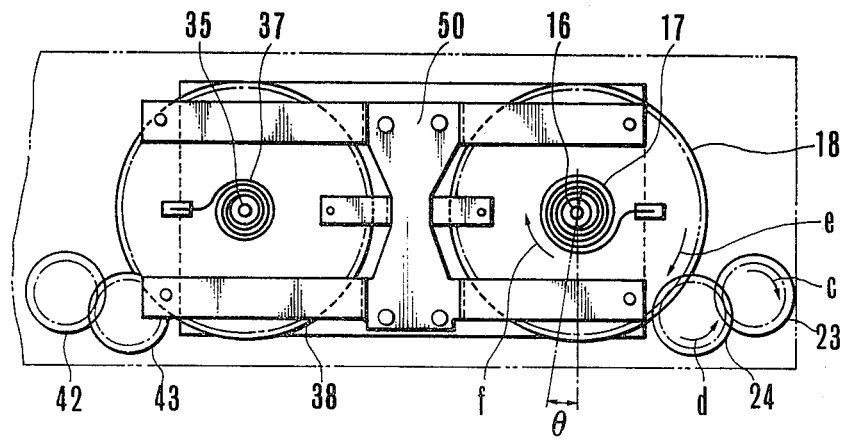
FIG. 3 is a front view of one embodiment of the inclinometer according to the present invention, with an illustration wherein a panel, knobs and indicators are removed.
Figure 4:
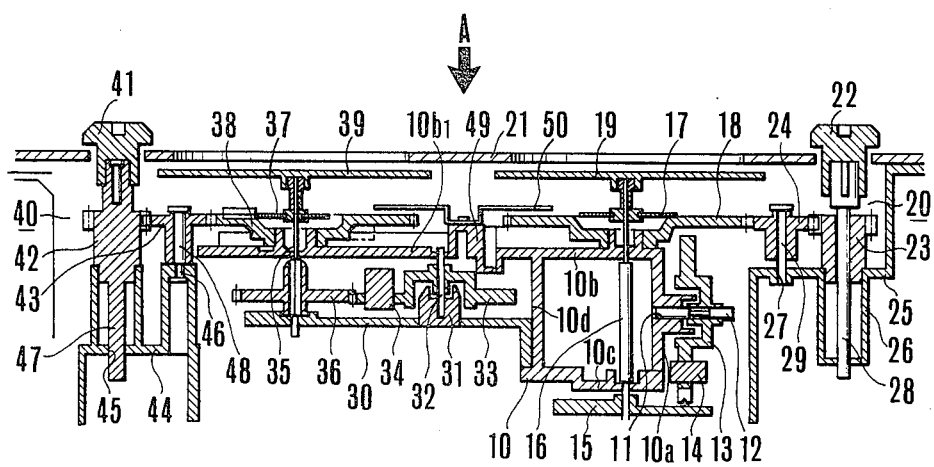
FIG. 4 is a longitudinal sectional view of the inclinometer shown in FIG. 3.
Figure 5:
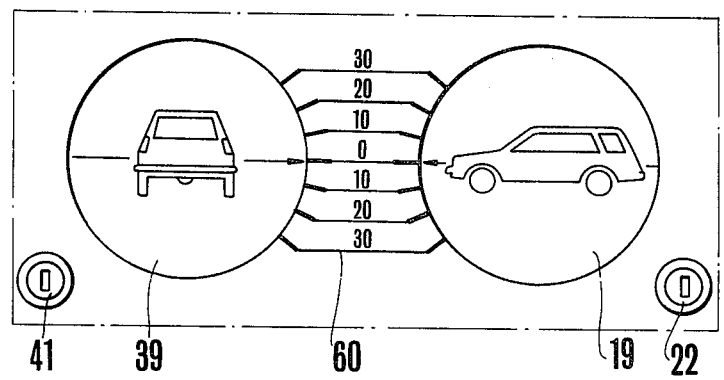
FIG. 5 is a partial front view of the inclinometer as viewed in arrow A in FIG. 4.

A preferred embodiment of this invention shown in FIGS. 3, 4 and 5 includes a frame 10 having a configuration as shown. A side plate 10a of the frame 10 is formed with an opening 11 for rotatably supporting a drive shaft 12 for fore and aft inclination indication, and a drive gear 13 is secured to the drive shaft 12 in parallel with the side plate 10a. A weight 14 acting as a drive source is mounted on the drive gear 13 perpendicularly to its periphery (for the sake of depiction, the weight 14 is shown displaced 90°) so that the drive gear 13 is rotated corresponding to the displacement of the weight 14. A driven gear 15 orthogonal to the drive gear 13 meshes therewith. The driven gear 15 is secured to one end of a horizontal driven shaft 16 journaled at openings of fore and aft plates 10b and 10c of the frame 10. The inner end of a zero point adjusting spiral hair spring 17 is secured to one end of the driven shaft 16, and the outer end of the hair spring 17 is secured to a hair spring drive gear 18 coaxial with the driven shaft 16. A disc shaped fore and aft inclination indicator 19 is secured to the front end of the driven shaft 16. Accordingly, when the drive gear 13 rotates in response to the displacement of the weight 14, torque is transmitted to the driven gear 15 to rotate the driven shaft 16 so that the inclination indicator 19 displays an inclination angle proportional to the torque caused by the displacement of the weight 14 with respect to a scale board 60 shown in FIG. 5. The hair spring drive gear 18 is associated with a zero point adjusting mechanism 20 for balancing the torque caused by the weight 14 and the hair spring 17. This mechanism 20 includes a zero point adjusting knob 22 on the righthand side of a panel 21, a correction gear 23 rotatably supported by a shaft 28 of the zero point adjusting knob 22, and a reversing gear 24 meshing with the correction gear 23, and the hair spring drive gear 18 meshes with the reversing gear 24. When the adjusting knob 22 is rotated in the clockwise direction, the hair spring drive gear 18 will be rotated in the same direction through the gears 23 and 24 to apply a torque to the hair spring 17, thereby contracting the hair spring 17. Conversely, as the knob is rotated in the counterclockwise direction, a torque is applied to expand the hair spring 17. As shown, the gears 23 and 24 are respectively secured to the shafts 28 and 29 journalled by the bearings 26 and 27 supported by a frame 25.

A bearing 31 is secured to a frame 30 secured to a side plate 10d of the frame 10 to extend in the horizontal direction, and a left and right inclination drive shaft 32 is supported between a front plate 10b1 of the frame 10 and the bearing 31 to extend in the horizontal direction. The drive shaft 32 carries a drive gear 33, and a weight 34 acting as a drive source is mounted on the drive gear 33 (fore the sake of depiction, shown at a position displaced by 90°). The drive gear 33 meshes with a driven gear 36 on a driven shaft 35 rotatably supported between the front plate 10b1 of the frame 10 and the frame 30. The inner end of a zero point adjusting spiral hair spring 37 is secured to the front end of the driven shaft 35, while the other end is secured to a spring drive gear 38 concentric with the driven shaft 35. A disc shaped left and right inclination indicator 39 is secured to the front end of the driven shaft 35. Consequently, the indicator 39 displays, with respect to the scale board 60, an inclination angle proportional to torque caused by the displacement of the weight 34 which occurs when the torque of the drive gear 33 is transmitted to the driven gear 36.

A zero point adjusting mechanism 40 is provided for the hair spring drive gear 38 for balancing the torque caused by the weight 34 and the zero point adjusting hair spring 37. The zero point adjusting mechanism 40 includes a zero point adjusting knob 41 on the lefthand side of the panel 21, a correction gear 42 rotatably supported by the knob 41, and a reversing gear 43 meshing with the correction gear 42 and with the hair spring drive gear 38.

When the zero point adjusting knob 41 is rotated in the clockwise direction, the hair spring drive gear 38 will be rotated in the same direction through the correction and reversing gears 42 and 43, respectively, to contract the zero point adjusting hair spring 37. Conversely, as the knob 41 is rotated in the counterclockwise direction, the zero point adjusting hair spring 37 is expanded. The correction and reversing gears 42 and 43, respectively, are supported by shafts 47 and 48 respectively journaled by bearings 45 and 46 provided for a frame 44. A clamping spring 50 is secured to the front end 49 of the frame 10 with screws, not shown, for preventing accidental removal of the hair spring drive gears 18 and 38. The scale board 60, graduated with inclination angles, is provided on the panel 21 to confront the periphery of the fore and aft inclination indicator 19, and left and right inclination indicator 39, respectively.

The inclinometer described above operates as follows. It is now assumed that the panel 21 of the inclinometer is mounted vertically on the dash board of a vehicle. When the vehicle inclines in the fore and aft direction, the weight 14 rotates the drive shaft 12 because the weight has a tendency to maintain the horizontal criterion due to gravity exerted thereon. The drive shaft 12 is rotated then by a torque proportional to the amount of relative displacement of the weight to drive the drive gear 13. Consequently, the driven gear 15 rotates against the force of the zero point adjusting hair spring to rotate the fore and aft inclination indicator 19. Thus, the inclination indicator 19 displays a fore and aft inclination angle of the vehicle proportional to the torque applied by the weight 14.

When the vehicle inclines in the left and right direction, due to gravity, the weight 34 rotates the drive shaft 32. Then the drive shaft 32 is rotated by a torque proportional to the amount of relative displacement of the weight 34 to rotate the drive gear 33, whereby the driven gear 36 is rotated against the force of the zero point adjusting hair spring 37 to rotate the left and right inclination indicator 39. Thus, the indicator 39 displays a left and right inclination angle of the vehicle proportional to the torque exerted by the weight 34.

When mounting an inclinometer on a vehicle, the inclinometer is not always mounted at a correct horizontal position so that the zero point display of the fore and aft inclination indicator 19 would not display a correct zero point. Thus, when the inclinometer is set on the minus side with reference to the zero point, the zero adjusting knob 22 is rotated in the clockwise direction. Then the correction gear 23 rotates in the direction of arrow a shown in FIG. 3 to rotate the reversing gear 24 in the direction of arrow b, thus rotating the spiral hair drive gear 18 in the direction of c. Then a torque is applied to the outer end of the hair spring 17 in a direction of arrow d to contract the spring. Accordingly, the driven shaft 16 rotates by an angle $\theta$ corresponding to the torque to change a point at which the torque applied by the weight and the torque of the spring balance with each other. This causes the fore and aft inclinaion indicator 19 to rotate in the plus direction, thus adjusting the zero point without rotating the associated scale board. Accordingly, after the zero point has been adjusted, the zero point display line of the fore and aft inclination indicator 19 and the scale line of the scale board are aligned horizontally.

On the other hand, where the fore and aft inclination indicator is on the minus side, the zero point adjusting knob 22 is rotated in the counterclockwise direction to adjust the zero point. When the left and right inclination indicator 39 does not show the zero point, in the same manner as the fore and aft inclination indicator 19, the zero point adjusting knob 41 is rotated.

It should be understood that the invention is not limited to the embodiment described above. For example, the outer end of a hair spring may be secured to a drive shaft associated with the weight so as to contract or expand the hair spring, thereby changing the balancing points of the torques.

As described above, according to this invention, a zero point adjusting spiral hair spring is secured to a drive shaft, or driven shaft of the inclinometer while the outer end of the spring is adjusted by a knob for changing a point at which torque caused by a weight and a torque applied by the spring balance with each other. Accordingly, the zero point can be adjusted readily and after adjustment of the zero point display line, and the zero point scale line can be aligned horizontally, thereby improving appearance of display of the zero point. Furthermore, since spring force of the hair spring is constantly applied to the gears, backlash thereof can advantageously be eliminated to cause the inclinometer to correctly follow inclinations, giving rise to correct display of inclination angles.

What is claimed is:

1. In an inclinometer of the type wherein a weight rotatable in accordance with an inclination of a vehicle on which the inclinometer is mounted is provided for a drive unit, and a torque of said drive unit is transmitted to a driven unit so as to display an inclination angle of said vehicle with an inclination indicator fixed to a shaft of said driven unit, the improvement which comprises a zero point adjusting spiral spring, means for securing an inner end of said spring to a shaft of said driven unit, means for securing an outer end of said spring to a rotary drive member, and a zero point adjusting knob for rotating said rotary drive member.

2. The inclinometer according to claim 1 wherein said weight is mounted on a drive gear rotatable about an axis perpendicular to that of said inclination indicator, and said drive gear meshes with a driven year for rotating said inclination indicator.

3. The inclinometer according to claim 1 wherein the outer end of said spiral spring is secured to a hair spring drive gear rotated by said zero point adjusting knob.

* * * * *

UNITED STATES PATENT AND TRADEMARK OFFICE
CERTIFICATE OF CORRECTION

PATENT NO. : 4,426,788
DATED : January 24, 1984
INVENTOR(S) : Hisashi Hirose et al.

It is certified that error appears in the above-identified patent and that said Letters Patent is hereby corrected as shown below:

Column 2, line 44, delete "perpendiculary" and insert ---- perpendicularly ----.

Column 3, line 13, delete "nalled" and insert ---- naled ----.

Column 3, line 22, delete "fore" and insert ---- for ----.

Column 4, line 3, delete "rotated then" and insert ---- then rotated ----.

Column 4, line 27, after "zero" insert ---- point ----.

Column 4, line 37, delete "inclinaion" and insert ---- inclination ----.

Column 6, line 7, delete "year" and insert ---- gear ----.

Signed and Sealed this

Fifth Day of March 1985

[SEAL]

Attest:

DONALD J. QUIGG

Attesting Officer    Acting Commissioner of Patents and Trademarks